United States Patent
Greene et al.

(10) Patent No.: US 6,434,662 B1
(45) Date of Patent: Aug. 13, 2002

(54) SYSTEM AND METHOD FOR SEARCHING AN ASSOCIATIVE MEMORY UTILIZING FIRST AND SECOND HASH FUNCTIONS

(75) Inventors: Spencer Greene, Palo Alto, CA (US); Gershon Kedem, Chapel Hill, NC (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 09/432,138

(22) Filed: Nov. 2, 1999

(51) Int. Cl.$^7$ ................................. G06F 12/00
(52) U.S. Cl. ........................... 711/108; 711/216
(58) Field of Search .......................... 711/216, 220, 711/108, 212; 370/381, 382, 383, 389, 392, 393

(56) References Cited

U.S. PATENT DOCUMENTS

| | | | | |
|---|---|---|---|---|
| 4,538,240 A | * | 8/1985 | Carter et al. | 708/492 |
| 4,897,785 A | * | 1/1990 | Züger | 711/216 |
| 5,339,398 A | * | 8/1994 | Shah et al. | 711/216 |
| 5,396,470 A | * | 3/1995 | Storn | 365/230.01 |
| 5,414,704 A | * | 5/1995 | Spinney | 711/108 |
| 5,920,900 A | * | 7/1999 | Poole et al. | 711/216 |

OTHER PUBLICATIONS

Fox et al., "Practical Minimal Perfect Hash Functions for Large Database," *Communications of the ACM,*, pp. 105–121, vol. 35, No. 1, Jan. 1992.
Menezes et al., *Handbook of Applied Crytography*, pp. 80–86, CRC Press, 1996.
Mehlhorn, Kurt, *Data Structures and Algorithms*, pp. 118–145, Springer–Verlag, 1977.
Motwani et al., *Randomized Algorithms*, pp. 213–229, Cambridge University Press, NY, 1995.
Dietzfelbinger et al., "Dynamic Perfect Hashing: Upper and Lower Bounds", *SIAM J. Computing*, pp. 1–33, Jan. 7, 1990.

* cited by examiner

Primary Examiner—Glenn Gossage (57) ABSTRACT

A system and method form searching an associative memory using input key values and first and second hashing sections. Key values (Kn) can be hashed in the first hashing section (102) to generate first output values $H_1(Kn)$ that access a first store (104). The first store or memory portion (104) can include "leaf" pointer entries (106-2) and "chunk pointer" entries (106-3). A leaf pointer entry (106-2) points at data associated with an applied key value. A chunk pointer entry (106-3) includes pointer data. If a chunk pointer entry (106-3) is accessed, the key value (Kn) is hashed in the second hashing section (108) to generate second output values $H_2(Kn)$ that access a second store or memory portion (110). Second hashing section (108) hashes key values (Kn) according to selection data SEL stored in a chunk pointer entry (106-3). The system may also include a first memory portion accessed according to address values from the first hashing section and a second memory portion accessed according to address values that include outputs from the second hash section and a chunk base address value. The hash based associative system allows for the selection of a second hash function that has been precomputed at table build time to be perfect with respect to a small set of colliding key values, provides a deterministic search time independent of the number of table entries or width of the search key, and allows for pipelining to achieve highest search throughput.

24 Claims, 7 Drawing Sheets

SYSTEM AND METHOD FOR SEARCHING AN ASSOCIATIVE MEMORY UTILIZING FIRST AND SECOND HASH FUNCTIONS

TECHNICAL FIELD

The present invention relates generally to associative memory systems, and more particularly to associative memory systems that use hash functions.

BACKGROUND OF THE INVENTION

Associative memory systems can typically receive a first set of data values ("keys") as inputs. Each key maps to an associated data value of a second set ("associated data"). Keys and their associated data form a database. The database can then searched by applying a key value to the associative memory system.

Associative memory systems have a variety of applications. Some applications may be optimized to accommodate large data structures, others may be optimized for transaction accuracy or reliability, still others may be optimized for search speed or update speed.

A content addressable memory (CAM) is one type of associative memory. While CAMs can provide relatively fast search speeds, CAMs also have a relatively high component cost. Therefore we seek to achieve high associative memory throughput using denser, less expensive random access memories (RAMs).

Figure 7:
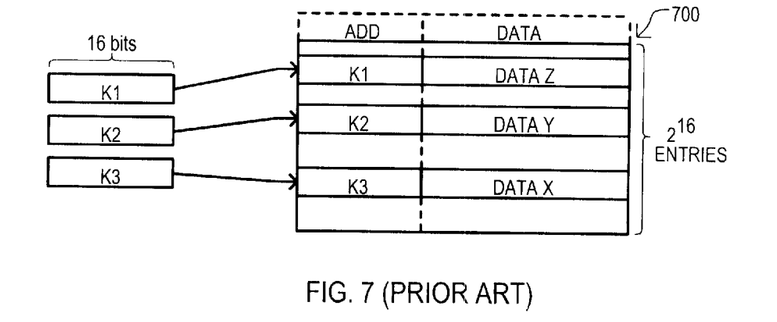
FIG. 7 is a diagram of an associative memory system according to a first conventional example.

One way to provide fast access times is to form an associative memory system in which a RAM memory location is provided for every possible input key. One example of such a system is shown in FIG. 7. The system of FIG. 7 can receive input key values having "n" bits. Three key values are shown as K1, K2 and K3. Input key values can be applied to a memory 700 that includes $2^n$ entries. Consequently, for each possible input key value, there is a corresponding memory 700 entry. In the particular arrangement of FIG. 7, a memory 700 is a random access memory, and key values can be applied to the memory 700 as addresses. Three entries corresponding to the key values K1, K2 and K3 are shown. Each entry is accessed by an address that is a key value, and stores data associated with the key value. For example, the application of key value K1 results in the associated data value DATA Z being provided by memory 700.

A system with direct mapping can be feasible when the number of possible input key values is small, as for example when the key is a binary number only a few bits wide. However, for wider key values (larger key domain), direct mapping is impractical, as the resulting memory size becomes undesirably large. Further, in most applications, a system stores only a tiny fraction of all possible key value permutations. In such a case, a direct mapping approach results in inefficient use of memory.

For larger key domains, hashing is another conventional approach. A hash function translates values in one address space to values in a smaller address space. For example, if a system received 128-bit key values, such key values could be translated by a hash function into a set of 16-bit hash bucket addresses.

"Collisions" present the major practical challenge in using hash functions for associative data systems. In our 128-bit key example, if a hash function $h(x): \{0,1\}^{128} \rightarrow \{0,1\}^{16}$ maps 128-bit keys to 16-bit hash bucket indices, a simple counting argument shows that many different possible 128-bit keys must hash to each of the 64K different addressable locations ("buckets"). If the keys stored in the associative memory system include multiple keys that hash to the same bucket b, then when an input search key hashes to bucket b, some further "collision resolution" method is required to determine which of the keys stored in bucket b—if any—matches the search key. Further, even if a bucket b holds only one key, and a search key hashes to the same bucket b, it is possible that the search key is not the same as the key stored in the table, but is an "alias" to that key, that just happens to hash to the same bucket. Therefore, even when a single candidate search result is found, the key stored in the table must be compared against the input search key to resolve such aliases.

Mathematics has proven that there does exist, for any particular static set of keys and any table size larger than the number of keys, one or more "perfect" hash functions for which no two keys in the set collide. However, mathematical results have also shown that for large key sets (thousands to millions of keys), the computational complexity of finding such perfect hash functions is extremely high; and further, the storage complexity of describing a hash function that has been found is also high. These results make perfect hashing impractical for large, dynamic data sets.

A number of conventional approaches have been proposed for addressing hash collisions. One possible approach would be to select a new hashing function, and then re-translate the entire current data structure into a new data structure without a collision. Such an approach is undesirable as it can consume considerable time and consume considerable computing resources.

Other conventional approaches for addressing hash function collisions include using a "linked-list." A linked list can access a number of memory entries in series. An example of a system having a linked-list is shown FIG. 8.

Figure 8:
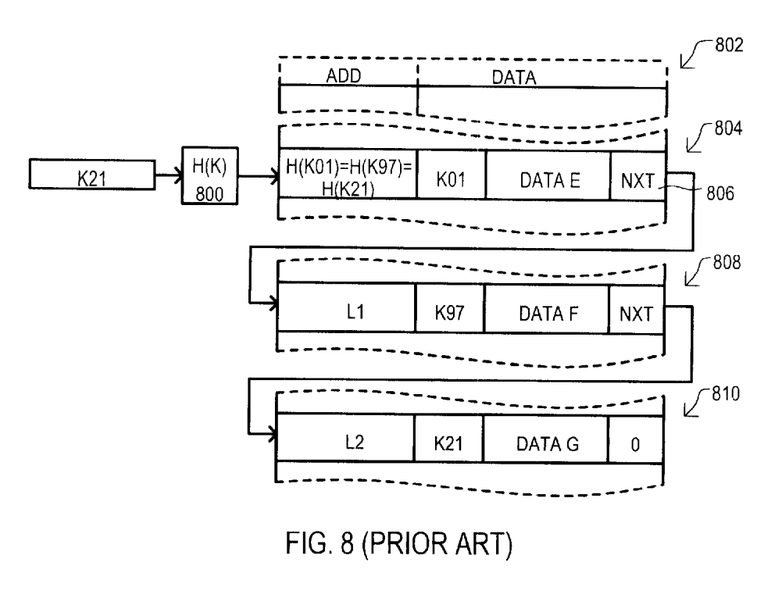
FIG. 8 is a diagram of an associative memory system according to a second conventional example.

A key value K21 is applied to a hash function 800. The output of hash function 800 is an address to a memory 802. In FIG. 8, three different table entries (for keys K01, K97 and K21) map to the same memory location or hash bucket. Thus, the address for one entry 804 is shown as (H(K01)=H(K97)=H(K21)). The entry 804 includes one of the key values K01 and its associated data. Further, the entry 804 is linked with a linked-list "next" pointer 806 to a second entry 808 that includes the key value K97 and its associated data. Entry 808 is linked with a linked-list "next" pointer to a third entry 810 having the key value K21 and its associated data. The "next" pointer of this third entry is null, indicating that there are no more entries in the list.

In the arrangement of FIG. 8, when the key value K21 is applied, hash function 800 accesses entry 804. The applied key value K21 is compared to the stored key value K01. Because the key values are different, the next entry 808 at the linked-list pointer 806 is accessed. The applied key value K21 is compared once again to the stored key value K97. Because the key values are again different, accesses continue according to the linked list pointer 806. Entry 810 is then accessed. The applied key value K21 is once again compared to the stored key value K21. Because the key values are the same, the corresponding associated data DATA can be provided as an output value.

A drawback to the above-described arrangement is that multiple memory read accesses and compare operations may be required, up to the length of the longest linked-list in the table in a worst case search. The length of the longest linked list depends on the table contents and can grow large.

Another conventional approach for addressing hashing function collisions includes a search tree. In one particular case, a search tree uses a number of search criteria to arrive at the desired associated data. An example of a collision resolution system having a binary search tree shown FIG. 9.

Figure 9:
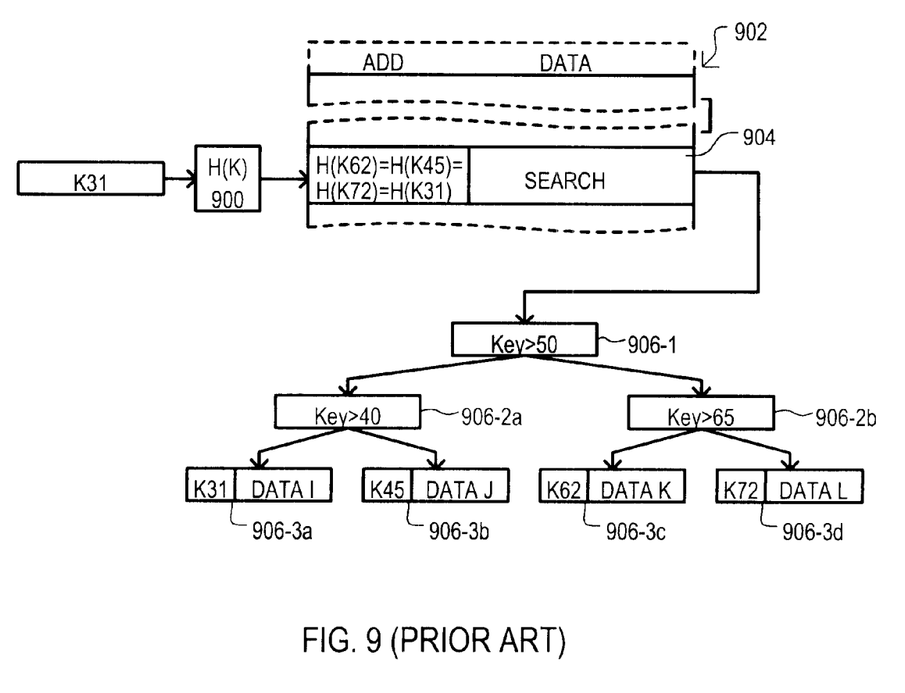
FIG. 9 is a diagram of an associative memory system according to a third conventional example.

The example of FIG. 9 includes some of the same general items as FIG. 8. A key value K31 is applied to a hash function 900. The output of hash function 900 is an address to a memory 902. In FIG. 9, four different key values (K62, K45, K72 and K31) hash to the same memory entry. Thus, the address for one entry 904 is shown as (H(K62)=H(K45)= H(K72)=H(K31)). The entry 904 can activate a binary search operation to select among the data associated with the four possible key values (K62, K45, K72 and K31). As just one example, a particular pointer value SEARCH can be stored in entry 904. The output of this value SEARCH can cause a particular binary tree search to be performed.

One particular binary search arrangement is illustrated by search steps 906-1 to 906-3d. In search step 906-1, the applied key value is compared to a predetermined value to select two of the four possible key values. Search steps 906-2a and 906-2b can select one key value from two. Search steps 906-3a and 906-3b can provide the data associated with a particular key value at the leaf level. In FIG. 9, data values DATA I, DATA J, DATA K and DATA L are associated with key values K31, K45, K62 and K72, respectively. At the selected leaf of the binary tree search, a compare against a stored key value is performed, to resolve aliasing.

A drawback to the above-described arrangement is that the various search steps add to an access time. In particular, a binary search among "m" different values can require $\log_2 m$ search and compare steps. The number of collisions that occur at each table location is dependent on the contents of the table. For randomly distributed hash function output, the number of collisions per location tends to be relatively small, but there is a certain probability of encountering a larger number of collisions, which would result in longer search time. This property makes it impossible to set a tight upper bound or worst-case on the number of search steps. In many real-time applications, deterministic performance is required. Further, for maximum throughput performance, it is desirable to fully pipeline a search algorithm such that each discrete step can be executed by separate dedicated hardware. Without a deterministic number of steps, an algorithm cannot be fully pipelined in this way.

It would be desirable to arrive at some way of providing an associative data system that can have the memory size advantages of search systems using hash functions, but not suffer from indeterminate access times that may arise from hash collisions. Such a system, to be practical, must also permit efficient update of table contents, without the large pre-processing times required for perfect hash functions of large key sets.

SUMMARY OF THE INVENTION

According to one embodiment, an associative data system can receive input key values. A first hashing function maps the input key values into first output values. The number of first output values is smaller than the number of all possible key values. When a set of different table key values collides at the same first output value, a second small perfect hash function maps the set of colliding key values to second output values. Thus, essentially all key searches can be accomplished in two accesses.

According to another embodiment, a first hash function maps input key values to first memory locations. When multiple keys map to the same first memory location, the first memory location is a "chunk pointer" entry that provides second hash function parameters. Second hash function parameters are used to generate a second perfect hash value that selects between the multiple key values that collide at a particular first memory location.

According to one aspect of the above embodiment, a pointer entry can include a chunk base address within a second memory. The chunk base address can be combined with second outputs generated by the second hash function to generate a second memory address. The second memory address stores a pointer to a location in a third memory, where a key value and associated data corresponding to the key value are stored.

According to another aspect of the above embodiment, when one input key maps to a first memory location at which there is no collision, the first memory location points to an entry in a third memory that includes a key value and associated data corresponding to a table key.

According to another aspect of the above embodiment, when no input keys map to a first memory location, the first memory location can be a null entry that includes data indicating that there is no stored data that is associated with the corresponding input key, or with any input key that hashes to that address.

According to one aspect of the above embodiments, a second hash function can map input key values to a second output space. The size of the second output space can be selectable.

According to another aspect of the embodiments, a first and/or second hash function can include Galois field multiplication and division (modulo operation).

DETAILED DESCRIPTION OF THE EMBODIMENTS

Various embodiments of the present invention will now be described in conjunction with a number of diagrams. The first embodiment is directed to a system that can store data values which correspond to input key values. A method for operating the associative memory is also described.

Figure 1:
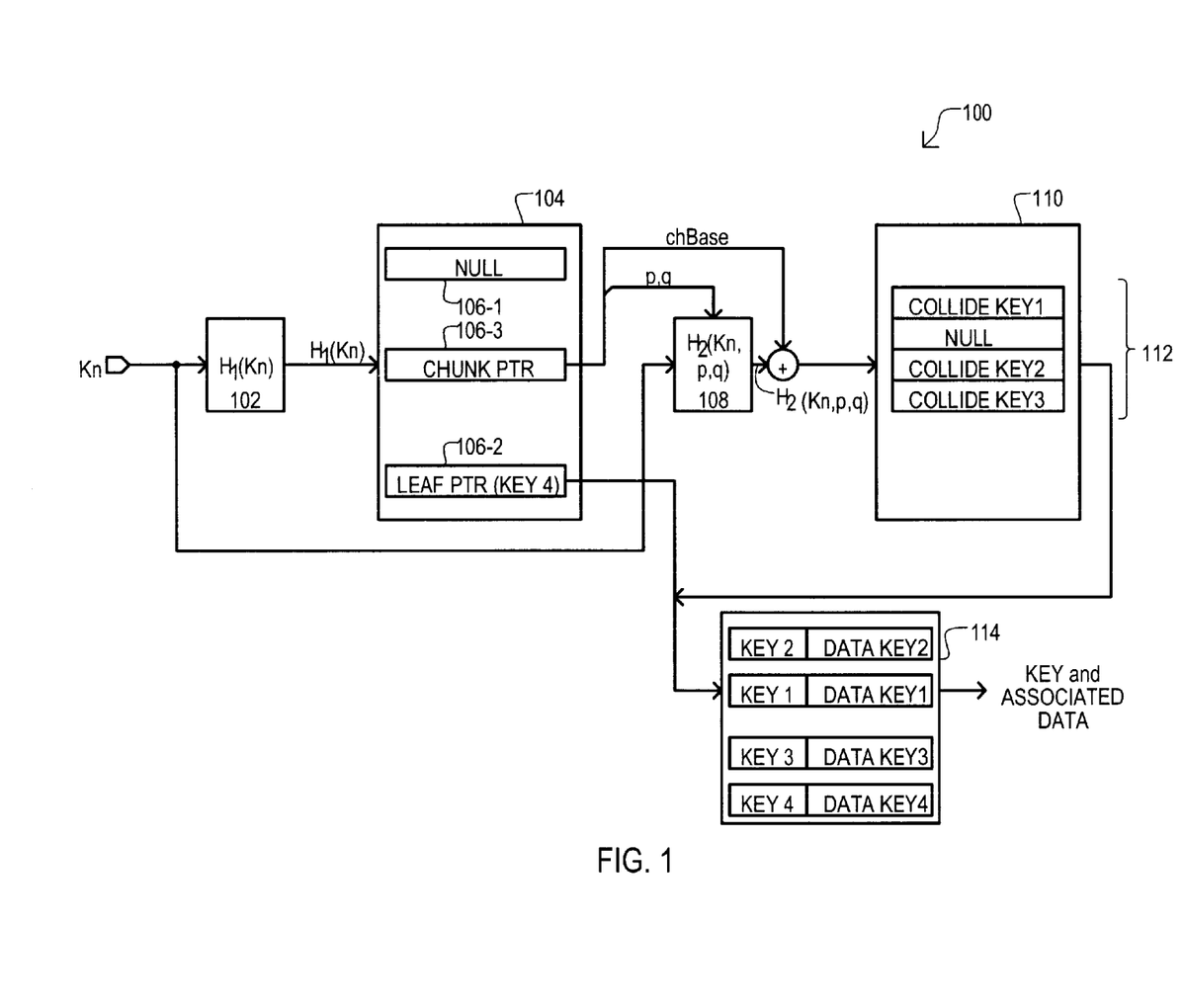
FIG. 1 is a block diagram of a first embodiment of an associative memory system consistent with the principles of the invention.

Referring now to FIG. 1, a first embodiment of an associative memory system consistent with the principles of the invention is set forth in a block diagram and designated by the general reference character 100. System 100 includes a first hashing section 102 and a first store 104. Input keys (Kn) are received by the first hashing section 102. The first hashing section 102 performs a first hash function on input key values (Kn) to generate first output values $H_1$(Kn). First output values ($H_1$(Kn)) are used to access locations in first store 104.

In the particular arrangement of FIG. 1, key values Kn are 128-bit binary numbers, but other data widths are also possible. The first hashing section 102 maps key values to locations within the first store 104. The number of entries in first store 104—which number is the size of the output range provided by hashing section 102—will generally be selected to be larger than the number of keys to be stored in the system. Still, the distribution of hashed keys into hash buckets is not perfectly balanced in general, so that some locations in first store 104 will be empty (0 keys), some will correspond to exactly 1 key, and some will correspond to multiple keys ("collisions").

Based on these three cases, each word stored within first store 104 can take one of three forms. A location can contain a "null" entry (one of which is shown as 106-1), a "leaf pointer" entry (one of which is shown as 106-2), or a "chunk pointer" entry (one of which is shown as 106-3). A null entry 106-1 can indicate that the system 100 holds no key that hashes to the same bucket as an applied key value—hence, that it cannot contain the key in question. A leaf pointer entry 106-2 can indicate that the system 100 holds exactly one key that hashes to the same bucket as the applied key value.

A chunk pointer entry 106-3 can indicate that more than one key has mapped to the corresponding 106-3 location. Key values that result in the same hashing output value will be referred to herein as "colliding" key values. When a chunk pointer entry 106-3 is accessed by a key value, information retrieved from the chunk pointer location 106-3 is used as a parameter to a second hash function. The second hash function selects a memory location corresponding to the applied key value. The memory location is selected from multiple memory locations that store the colliding key values.

System 100 thus further includes a second hashing section 108 and a second store 110. If an input key (Kn) accesses a chunk pointer entry 106-3 in first store 104, the second hashing section 108 performs a second hash function on the colliding input key value to generate a second output value $H_2$(Kn, SEL). A second hash function can be parameterized according to information provided by the corresponding chunk pointer entry 106-3. Parameter information is shown as P,Q in FIG. 1. This can allow for the selection of a second hash function that has been precomputed at table build time to be perfect with respect to the small set of colliding key values.

Locations within second store 110 are arranged in "chunks." One exemplary chunk is shown in FIG. 1 as item 112. A chunk 112 corresponds to the output range of a given second hash function. The set of colliding key values is stored within this space. In the particular example of FIG. 1, chunk 112 includes entries for three colliding key values, shown as COLLIDE KEY1, COLLIDE KEY2 and COLLIDE KEY3.

In one particular arrangement, a chunk pointer entry 106-3 can provide a base address value for a chunk, chBase. Thus, this base value is combined with a second output value from second hashing section 108 to generate a particular second store 110 location.

According to one particular arrangement, a first hash function implemented by first hashing section 102 includes operations in a finite Galois field $GF[2^n]$. More particularly, the first hash function can include multiplication and modulo function in the ring GF[2][x]. Even more particularly, the first hashing function can be given by the equation set forth below. In the preferred embodiment, the *, + and mod functions are interpreted as operations in the ring of polynomials over GF[2], and the input operands are interpreted as polynomials over GF[2]. This form of arithmetic is well known in the art, as it is used in standard cyclic-redundancy check (CRC) coding, as well as other types of error-control codes and hash functions, among other applications.

$$H_1(K)=[(K*A+B) \bmod P] \bmod Q$$

The value K is a binary key value. The value A is a constant. The value B is also a constant, and in some embodiments is zero. P is an irreducible polynomial of degree n over GF[2], where n is the number of bits in the binary key value K, in this case 128. Q is an irreducible polynomial over of degree m over GF[2], where m is less than n, and $2^m$ is the number of entries in a first memory. For this embodiment the number of entries addressed by the first hash function must therefore be a power of two.

The first hashing function can be implemented as a Boolean expression, rather than utilizing multiplication and division (modulo) circuits. Since the multiplicand A, the addend B, and the moduli P and Q are constants, each bit of the output may be expressed as an exclusive-OR (XOR) of a certain number of input bits to compute the function $H_1$ as a fixed-function circuit.

According to one particular arrangement, a second hashing function implemented by second hashing section 108 can include operations in the ring of polynomials over GF[2]. More particularly, the second hashing function can include multiplication and modulo operation. Even more particularly, the second hashing function can be given by the equation set forth below.

$$H_2(K,p,q)=[(K*p) \bmod P] \bmod Q_q$$

The value K is a binary key value. The value p is a selectable parameter retrieved in the first hash function access. P is an irreducible polynomial of degree n over GF[2], where n is the number of bits in the binary key value K. $Q_q$ is an irreducible polynomial over GF[2]. The degree of $Q_q$ is selectable according to the parameter q, also retrieved in the first hash function access. In one very particular arrangement, the value p can range from 0 to 1023. The degree of $Q_q$ is selectable from 1 to 8.

By making the degree of $Q_q$ selectable, the resulting output range of a second hashing function is selectable. Consequently, in an arrangement such as that of FIG. 1, chunk sizes are selectable. This may have a number of advantages. Smaller chunk sizes may result in more efficient use of a second store. Larger chunk sizes may lower the probability of an undesirable double "collision" during the creation of an associative data structure. A double collision can result when a key value collides at a first store location, generated by a first hash function, and then also collides with another key value at a second store location, generated by a second hash function. Still further, such an arrangement can allow a set of colliding values to be rehashed from a smaller chunk into a larger chunk. Such an operation may be advantageous when one or more added key values map to a chunk that already includes data associated with other key values. Rehashing the smaller chunk can make room for the new key value data and/or decrease the probability of a double collision in the chunk.

By making the value p selectable, various second hash functions may be used in the second hashing section 108. This can enable the second hash function to be switched to more optimally hash a set of colliding key values.

A third store 114 stores one record for each key in the table. The record contains a copy of the key, to be used for resolving aliases, and the associated data to be returned in a successful find of that key. The third store 114 is accessed whenever either the first or the second store returns a leaf pointer.

Figure 2:
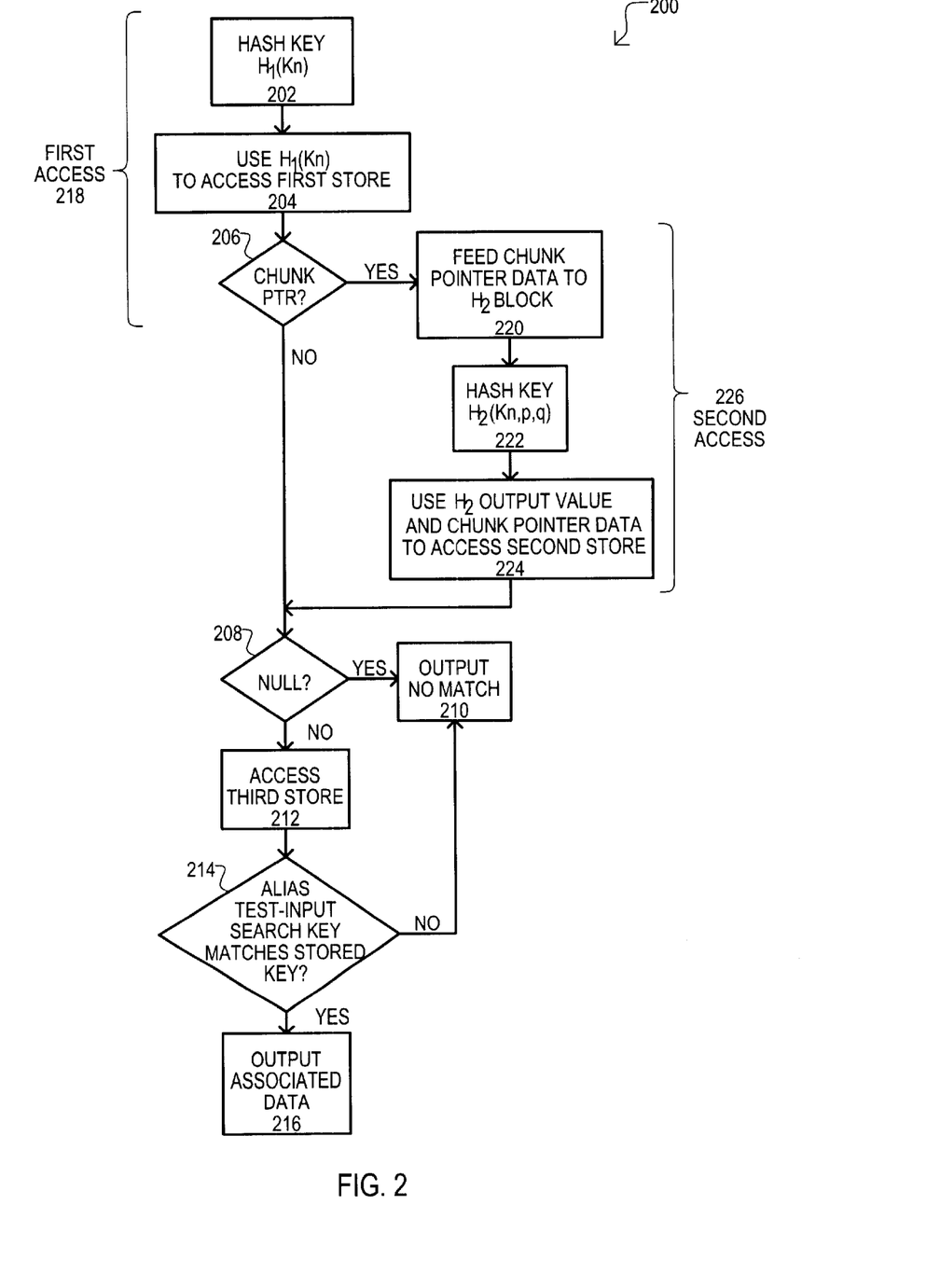
FIG. 2 is a flow diagram of a search operation according to an embodiment of the present invention.

Referring now to FIG. 2, a search operation according to an embodiment consistent with the principles of the invention is set forth in a flow diagram. The search operation is designated by the general reference character 200. The search operation 200 includes a first hashing step 202. A first hashing step 202 hashes an input key value according to a first hashing function $H_1(Kn)$. A resulting hash output value is used to access a first store (step 204).

How a search operation continues can depend upon the type of data accessed, such as a chunk pointer or a null value within the first store. In the event the data indicates a null value (determined in step 208), a "no match" value is generated (step 210). This indicates that the search was not successful. In the event the data indicates a leaf pointer (i.e., not a chunk pointer (determined in step 206) and not a null value (determined in step 208)), the third store 114 is accessed (step 212) to produce an alias. An alias compare is then performed and the stored key value is tested against the input search key (step 214): if they match, associated data can be output (step 216), if not, "no match" is output (step 210) based on the failed alias test.

It is noted that a null value is a single access operation, and a leaf pointer returned by the first access is a single pointer access plus single compare operation. This can be conceptualized by first access indicator 218 in FIG. 2.

In the event data accessed within first store 104 is a chunk pointer value (determined in step 206), chunk pointer data is used to drive subsequent steps (step 220). A search operation then continues with a second hashing step 222. The second hashing step 222 hashes the input key value according to a second hash function $H_2(Kn, p, q)$. The second hash function can be parameterized according to pointer data retrieved in the first memory access.

A resulting second hashing step output value is used, along with chunk base pointer data from the first access, to access a second store (step 224). The result of this second access is either a null pointer, or a leaf pointer (determined in step 208). In the case of a leaf pointer, third store 114 is accessed (step 212), an alias compare is done (step 214), and if there is a match (the address or key is not an alias), then the associated data fetched from the third memory can be output (step 216).

It is noted that an access to the second store can be a double access plus single compare operation. This can be conceptualized by first and second access indicators 218 and 226. All key values can be searched in two steps plus one compare. Unlike conventional hashing approaches, this number of search steps is both deterministic and small.

Figure 3:
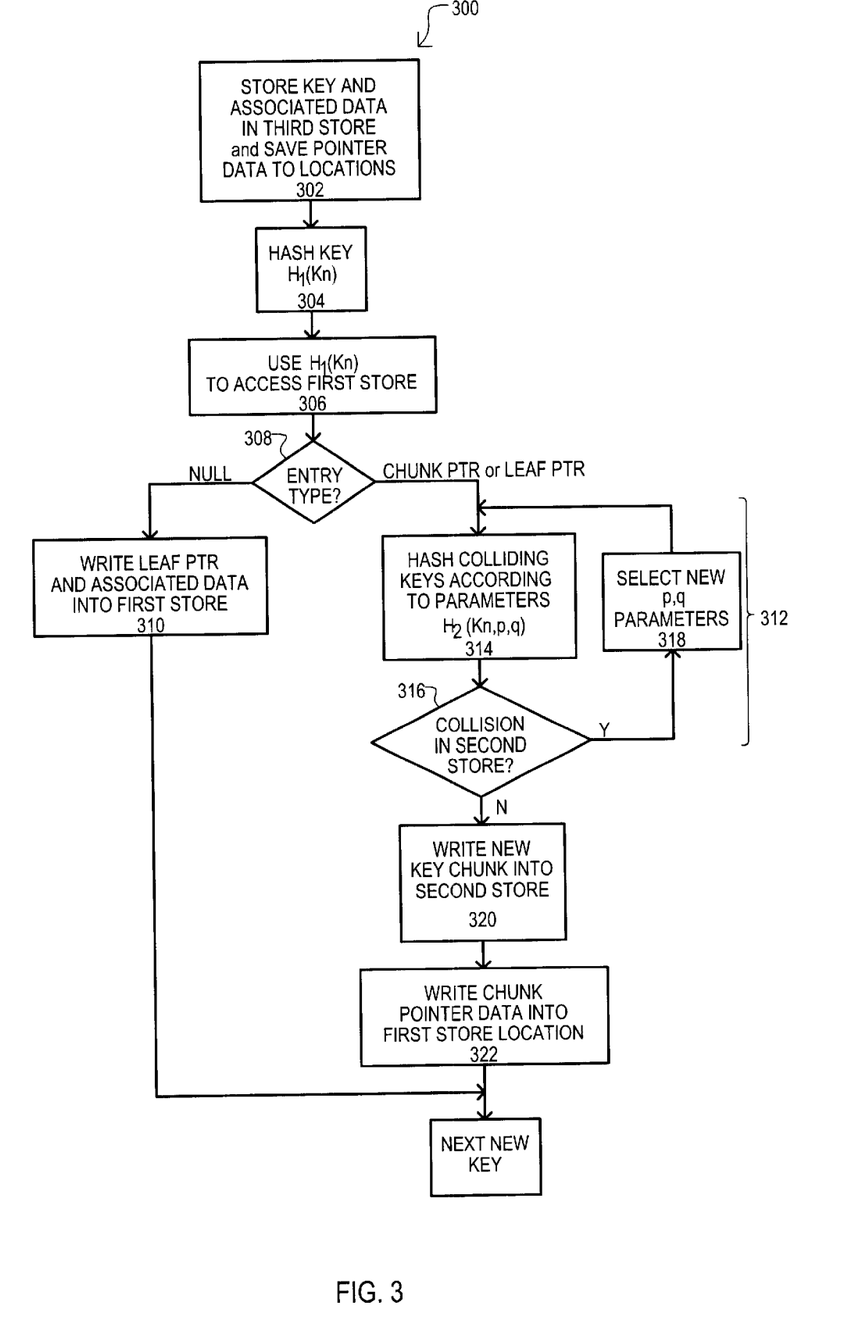
FIG. 3 is a flow diagram of a method for adding associative data according to an embodiment of the present invention.

The above search description has assumed a precomputed search data structure stored in the three memories. We now describe how this data structure can be built and how entries may be added or deleted dynamically. Referring now to FIG. 3, a method for adding associative data is set forth in a flow diagram and designated by the general reference character 300. Key and associated data are stored in third store 114 and pointer data to the locations are saved (step 302).

The data adding operation method 300 includes a first hashing step 304. A first hashing step 304 hashes an input key value according to a first hash function $H_1(Kn)$. A resulting hash output value is used to access a first store (step 306).

How an adding operation continues can depend upon the type of data accessed within the first store (determined in step 308). In the event the data indicates a null value, a pointer to the new key value and its associated data are written into the first store location (step 310).

In the event the data indicates a leaf pointer value or chunk pointer value (determined in step 308), the adding operation 300 continues with a second hashing loop 312 to find suitable parameter values. A second hashing step 314 hashes all colliding values with a second hash function $H_2(Kn, p, q)$ for particular values of p, q. The second hash function $H_2(Kn, p, q)$ is performed according to one set of many possible selection criteria.

The resulting second hashing function output values are checked for collisions in the second store (step 316). That is, if the colliding key values from the first hash operation hash into different hash output values using the second hash operation with the candidate p, q parameters, no collision exists. However, if two or more of the key values hash to the same output value using the candidate p, q parameters, a collision has occurred.

As shown in FIG. 3, in the event of a collision in the second store (determined in step 316), new second hashing functionparameters are selected (step 318). The method can then return to step 314, to "re-hash" the colliding key values according to a new second hashing function.

In the event no collision exists in the second store (determined in step 316), a new chunk is built in a second store. In particular, pointers to key values and their associated data are written in chunk locations according to their corresponding second hashing function output values (step 320). Pointer information for the newly formed chunk is then written into the corresponding pointer (or former leaf) location in the first store (step 322), thus completing the add of the new key to the system.

Figure 4:
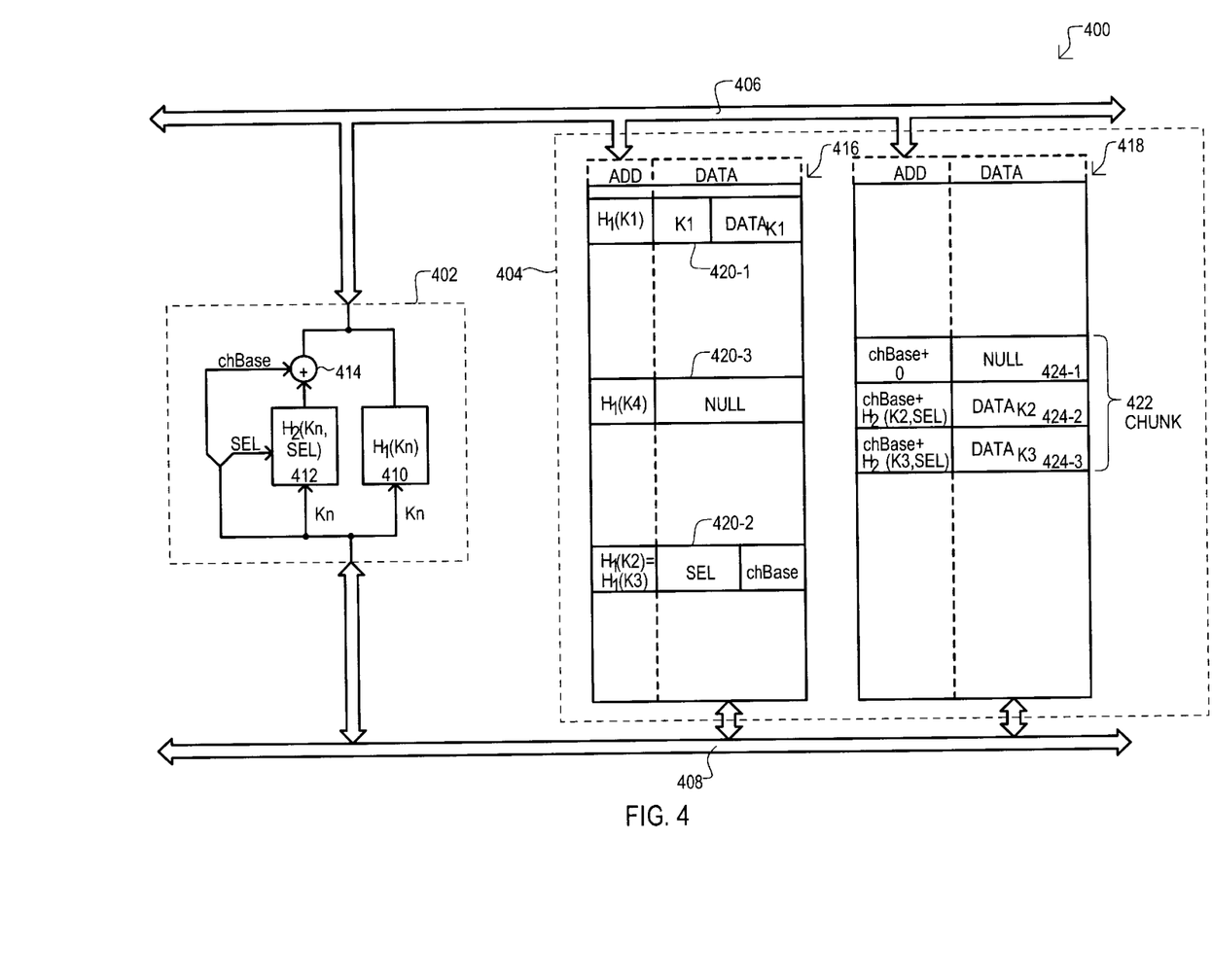
FIG. 4 is a block diagram of a second embodiment of an associative memory system consistent with the principles of the invention

Referring now to FIG. 4, a second embodiment of an associative memory system consistent with the principles of the invention is set forth in a block diagram and designated by the general reference character 400. The system 400 includes a processing system 402 and a memory system 404 commonly coupled to an address bus 406 and a data bus 408. Processing system 402 includes a first hash function calculator 410, a second hash function calculator 412, and an adder 414.

A first hash function calculator 410 receives key values from data bus 408, and performs a first hash function on such values. The first hash function results can be applied to the memory system 404 on address bus 406. A second hash function calculator 412 receives a key value, function parameter value (SEL), and a chunk base value (chBase). A particular second hash function, from a family of many possible second hash functions, can be selected according to the SEL values. The selected second hash function hashes a key value. The resulting second hashing function output value is added to the chBase value to generate a second memory address. The second memory address can be placed on address bus 406.

Processing system 402 can include a number of structures, such as a general-purpose processor device that includes registers and arithmetic/logic circuits, and executes a series of instructions to calculate a first and/or second hashing function. Alternatively, such a processor system may be implemented all, or in part, as a portion of an application specific integrated circuit (ASIC). Of course, the above-mentioned examples represent but two possible implementations.

The memory system 404 can include a first memory portion 416 and a second memory portion 418. First memory portion 416 can include a number of entries that can be accessed according to address values generated by the first hash function calculator 410. Second memory portion 418 can include a number of entries that can be accessed according to address values that include outputs from the second hash function calculator 412.

In one particular embodiment, first memory portion 416 can be a random access memory (RAM). Second memory portion 418 can also be a RAM. Further, the first and second memory portions may be different sections of the same RAM device.

The first memory portion 416 can include leaf entries with key and associated data information like 420-1, chunk pointer entries like 420-2, and null entries like 420-3. Second memory portion 418 can include a chunk 422 consisting of key and data information for several keys and possibly null entries for empty spaces in the chunk. Note that this embodiment has no third memory portion, as the key and associated data information are stored directly in the first and second memory portions.

In the particular arrangement of FIG. 4, leaf entry 420-1 has an address $H_1(K1)$ and stores associated data $DATA_{K1}$. Chunk pointer entry 420-2 has an address $H_1(K2)=H_1(K3)$ and stores the chBase and SEL values for the chunk. Null entry 420-3 has an address $H_1(K4)$ and stores associated data NULL.

Within second memory portion 418, chunk 422 occupies a series of consecutive entries. Three entries of the chunk 422 are detailed. Entry 424-1 is the first entry of the chunk and has an address (chBase+0) and stores associated data NULL. Entry 424-2 has an address (chBase+$H_2$(K2,SEL)) and stores associated data $DATA_{K2}$. Entry 424-3 has an address (chBase+$H_2$(K3,SEL)) and stores associated data $DATA_{K3}$.

Four search operations for the second embodiment of associative data system 400 will now be described.

In a first operation, key value K4 is applied to the system and received by first hash function calculator 410. Key value K4 is hashed to generate first output value $H_1(K4)$. The first output value $H_1(K4)$ is applied as an address value to first memory portion 410. In response to the address $H_1(K4)$, first memory portion 410 accesses null entry 420-3 and outputs the NULL data value on data bus 408. A NULL data value indicates no data associated with the key K4 is stored in the system.

In a second operation, key value K1 is applied to the system and received by first hashing function calculator 410. The value is hashed and output as first output value $H_1(K1)$. This value $H_1(K1)$ is applied as an address value to first memory portion 410. In response to the address $H_1(K1)$, first memory portion 410 accesses leaf entry 420-1 and tests the search key against the stored key K1. In the example of FIG. 4, the compare is TRUE, so the system outputs the data value $DATA_{K1}$ on data bus 408. In this way, the data value associated with the K1 key value ($DATA_{K1}$) can be accessed from the associative memory system.

In a third operation, key value K2 is applied to the system and received by first hashing function calculator 410. The value is hashed and output as first output value $H_1(K2)$. This value $H_1(K2)$ is applied as an address value to first memory portion 410. In response to the address $H_1(K2)$, first memory portion 410 accesses pointer entry 420-2 and outputs the pointer data chBase and SEL on data bus 408. The chBase and SEL values are applied to the second hashing function calculator 412 along with the key value K2.

The SEL data includes particular hashing function parameters that can select from a number of hash functions. The key value K2 is then hashed according to a selected hash function and output as a second output value $H_2$(K2, SEL). This value $H_2$(K2, SEL) is added to the chBase data and applied as an address value to second memory portion 418. In response to the chBase+address $H_2$(K2, SEL), second memory portion 410 accesses entry 424-2 and then compares the stored key and the search key. In the example of FIG. 4, the compare is TRUE, so it outputs the data value $DATA_{K2}$ on data bus 408. In this way, a data value associated with the K2 key value can be accessed from the associative memory system.

In a fourth operation, key value KX is applied to the system and received by first hash function calculator 410. The value can be hashed and output as first output value $H_1(KX)$, where it happens that $H_1(KX)=H_1(K2)=H_1(K3)$, although the key KX is not stored in the table. The value $H_1(KX)$ is applied as an address value to first memory portion 410. The KX value "collides" with the K2 value. Consequently, in response to the address $H_1(KX)$, first memory portion 410 accesses the same pointer entry 420-2 accessed by the K2 value. The same chunk pointer data chBase and SEL are placed on data bus 408 once again. The chBase and SEL values are applied to the second hashing function calculator 412, this time along with the search key value KX. The second hash of KX may point to a null chunk entry, in which case no-match is output immediately. Alternatively, the second hash of KX may point to a location within the chunk where a different key is stored. (The perfect hash constructed for the chunk applies only to those keys actually stored in the chunk. Since KX is not in the chunk, there is no guarantee that it does not collide with one of the chunk keys.) In this second case, KX will be detected as an alias at compare time and no-match will be output.

In one very particular arrangement, the second hashing function can be the previously described hashing function.

$$H_2(K,p,q)=[(K*p)\bmod P]\bmod Q_q$$

The SEL data is a 13-bit value that comprises two fields: a 10-bit value that corresponds to the p value, and a three-bit value that corresponds to the q value (the degree of the polynomial $Q_q$). Because p is a 10-bit value, there can be 1024 possible second hashing functions for each size q. The q value can select polynomials of degree 1 to 8. Consequently, each chunk includes 2 to 256 entries. Of course, such values have been optimized for particular applications and should not be construed as limiting the invention thereto.

As noted in conjunction with the embodiment of FIG. 1, a first hash function, such as $$H_1(K)=[(K*A+B)\bmod P]\bmod Q$$

can be simplified, for fixed values A, B, P, Q, as a single Boolean expression K, rather than a collection of polynomial multiplication and division circuits.

Figure 5:
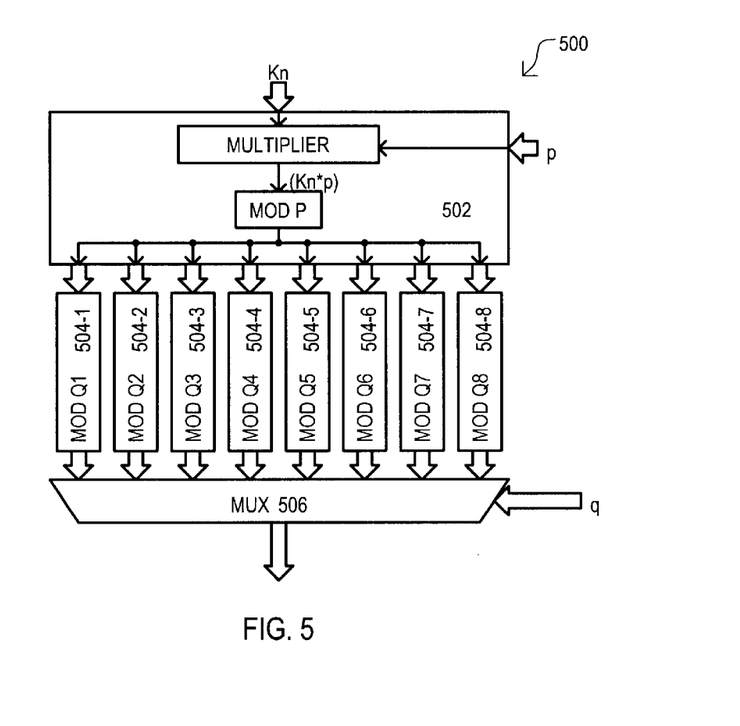
FIG. 5 is a block diagram of a second hashing function calculator according to one embodiment.

However, such an approach for the second hash functions may not be practical in those cases where many different hash functions can be selectable according to pointer data information. One example of a second hash function calculator is illustrated in FIG. 5.

A second hash function calculator is designated by the general reference character 500. The hash function calculator 500 can execute the function previously described.

$$H_2(K,p,q) = [(K*p) \bmod P] \bmod Q_q$$

The hash function calculator 500 includes a multiplier/mod P calculator 502. A multiplier/mod P calculator 502 includes a multiplier circuit that can receive a key value and multiply it by a selectable value p. The value p results in the selection of a particular hashing function from many hashing functions. The resulting polynomial product can be subject to a modulo P operation.

In one particular arrangement, the value p can be a 10-bit value, and the multiplier/mod P calculator 502 includes an n×10 Galois field GF[2] multiplier, where n is the number of bits in a key value.

Results from the multiplier/mod P calculator 502 are supplied to various mod $Q_i$ circuits, shown as 504-1 to 504-8. Each mod $Q_i$ circuit can provide a modulo $Q_i$ operation, where each $Q_i$ is an irreducible polynomial of a different degree. In the particular arrangement of FIG. 5, mod $Q_i$ circuits 504-1 to 504-8 have degrees of 1 to 8, respectively.

The output of the various mod $Q_i$ circuits (504-1 to 504-8) is provided to a multiplexer circuit (mux) 506. Mux 506 selects one of the various mod $Q_i$ circuits (504-1 to 504-8) according to an input value q. In the particular arrangement of FIG. 5, the q value ranges from 1 to 8.

In this way, a second hash function calculator 500 can take a form that may be advantageously implemented as a circuit. Such an implementation may hash key values at faster speeds than a general-purpose processor executing a series of instructions.

It is noted that mod P and mod Q operations may be performed by various circuits. As just one example, fixed exclusive-OR (XOR) trees for particular polynomial "divide-by" functions for P and each $Q_i$ are a well-known way to implement such functions.

Figure 6:
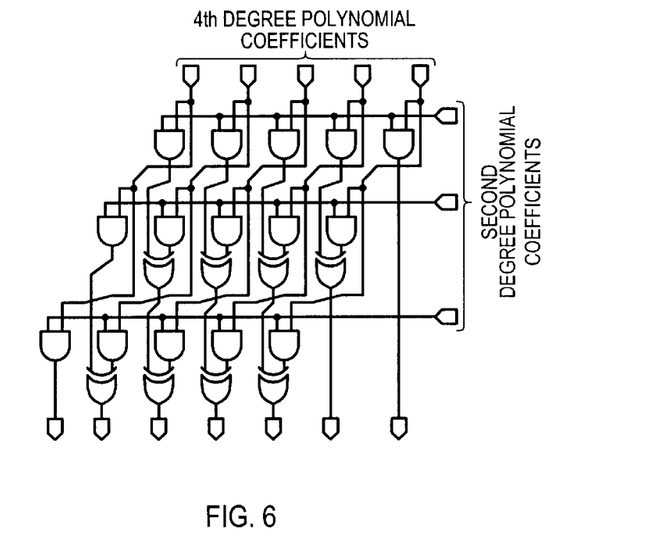
FIG. 6 is a schematic diagram of a Galois field GF[2] multiplier circuit.

Referring now to FIG. 6, a schematic diagram is set forth illustrating one of the number of table entries or width of the search key, and allows for pipelining to achieve highest search throughput.

The various embodiments illustrate a hash-based associative data system that provides a deterministic search time independent of the number of table entries or width of search key (except inasmuch as the compare step requires a data read equal to the width of the search key). This is in contrast to other hashing approaches that may utilize linked lists and/or search trees, or other collision resolution methods.

The system described herein has a certain probability of "insert failure." An insert failure occurs when adding a key to the table, it is discovered that for a certain set of keys that collide in $H_1$, among all the possible SEL parameter values, there is none that results in a collision-free $H_2$ output. By the construction of the particular $H_2$ function chosen herein, probability theory may be used to demonstrate that the probability of such failure is smaller than $2_{-32}$ for key sets as large as 10 million keys. Other choices of $H_2$ with similar properties could yield similar results.

The apparatus and methods described above can provide searches into a data structure with key values to retrieve corresponding associated data within a predetermined number of steps. The deterministic search time allows for pipelining to achieve highest search throughput. For example, such an application may allow for high-throughput processing of packet data. A packet processing database can be an associative memory, and packet header fields can be applied as keys to the associative memory.

It is understood that while the various embodiments describe systems that can include a first storage device that may include pointers to a second storage device, alternate approaches may include further levels of hashing. That is, as just one example, a first storage device may have pointers to a second storage device which may itself have pointers to a third storage device, and so on.

While the preferred embodiments set forth herein have been described in detail, it is understood that the present invention could be subject to various changes, substitutions, and alterations without departing from the spirit and scope of the invention. Accordingly, the present invention is intended to be limited only as defined by the appended claims.

What is claimed is:

1. A system, comprising:
   a first hash function calculator that hashes a search key value into a first output value;
   a first store accessed by the first output value;
   a second hash function calculator that hashes the search key value according to hashing criteria stored in a first store entry accessed by the first output value, the search key value being hashed into a second output value; and
   a second store accessed according to the second output value and at least one value stored in the first store entry.

2. The system of claim 1, wherein:
   the first hash function calculator includes a Galois field multiplier.

3. The system of claim 1, wherein:
   the first hash function calculator includes a Galois field divider.

4. The system of claim 1, wherein:
   the first store includes leaf entries having data associated with the key value of the leaf entry.

5. The system of claim 1, wherein:
   the first store includes pointer entries that include hashing criteria and a chunk base address.

6. The system of claim 1, wherein:
   the hashing criteria includes a value that selects a particular hash function from a number of hash functions.

7. The system of claim 1, wherein:
   the second hash function calculator includes a Galois field multiplier and the hashing criteria include a multiplicand for the Galois field multiplier.

8. The system of claim 1, wherein the second hash function calculator includes:
   a Galois field multiplier having an output coupled to a plurality of modulo circuits; and
   a multiplexer for selecting an output of one modulo circuit according to the hashing criteria.

9. The system of claim 1, wherein the search key value is from a domain of size D1, the first output value is from a range of size R1<D1, and the second output value is from a range of size R2<D1.

10. The system of claim 1, wherein the second output value comprises a collision-free hash value.

11. The system of claim 1, wherein:
    the hashing criteria includes a value that determines a width of the second output value.

12. The system of claim 11, wherein:
    the width of the second output value is from $2^1$ to $2^8$.

13. An associative memory system for receiving an input key value, the system comprising:
    a first memory accessed by a first hash function calculator;

a second memory accessed by a second hash function calculator;

the first hash function calculator receiving key values and providing first output values according to a first hash function;

the second hash function calculator generating a second output value based on key values and pointer data from the first memory, the pointer data corresponding to at least two key values and including parameter data and a chunk base address; and a combiner combining the second output value with the chunk base address to generate a second memory address.

14. The system of claim 13, wherein:
the first memory includes a random access memory.

15. The system of claim 13, wherein:
the second memory includes a random access memory.

16. The system of claim 13, wherein:
the first hash function includes the operation $$H_1(K) = [(K*A+B) \bmod P] \bmod Q$$

where, * is Galois field multiplication, + is Galois field addition, mod is a Galois field modulo operation, P and Q are irreducible polynomials over a Galois field, K is a key value, and A and B are constants.

17. The system of claim 13, wherein:
the second hash function calculator includes the operation $$H_2(K,p,q,i) = [(K*p+B_i) \bmod P] \bmod Q_q$$

where, * is Galois field multiplication, + is Galois field addition, mod is a modulo operation, P and $Q_q$ are irreducible polynomials over a Galois field, with the degree of $Q_q$ depending upon a value q, q varying according to parameter data, K is a key value, p can vary according to parameter data, and $B_i$ is a constant depending on a value i, i varying according to parameter data.

18. The system of claim 13, wherein:
the first output values are first memory addresses.

19. The system of claim 13, wherein the second output value comprises a collision-free hash value.

20. A method of implementing an associative memory, comprising the steps of:

hashing an input key to generate a first output value;

accessing a first store entry according to the first output value;

if the accessed first store entry is not a chunk pointer entry, comparing against stored key data, and either reporting a null result, or retrieving and delivering data; and if the accessed first store entry is a chunk pointer entry, retrieving chunk pointer data, hashing the input key according to the chunk pointer data to generate a second output value, and accessing a second store entry according to the second output value.

21. The method of claim 20, wherein:
the chunk pointer data includes parameter data and chunk base data; and the step of hashing the input key according to the chunk pointer data includes:
hashing the input key with a hashing function determined by the parameter data to generate a hash output value; and
combining the hash output value and the chunk base data to generate the second output value.

22. The method of claim 20, wherein:
each chunk pointer designates the start of a chunk, each chunk including x entries; and the step of hashing the input key according to the chunk pointer data includes hashing the input key into an output space x.

23. The method of claim 20, wherein:
each chunk pointer designates the start of a chunk, each chunk including x entries; and the step of hashing the input key according to the chunk pointer data includes hashing the input key into an output space x.

24. The method of claim 20, wherein the second output value comprises a collision-free hash value.

* * * * *